US009525617B2

(12) United States Patent
Vasseur et al.

(10) Patent No.: US 9,525,617 B2
(45) Date of Patent: Dec. 20, 2016

(54) DISTRIBUTED PREDICTIVE ROUTING USING DELAY PREDICTABILITY MEASUREMENTS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Diane Bouchacourt, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 14/268,627

(22) Filed: May 2, 2014

(65) Prior Publication Data

US 2015/0319077 A1  Nov. 5, 2015

(51) Int. Cl.
*H04L 12/721* (2013.01)
*H04L 12/727* (2013.01)
*H04L 12/26* (2006.01)

(52) U.S. Cl.
CPC ......... *H04L 45/124* (2013.01); *H04L 43/0852* (2013.01); *H04L 45/121* (2013.01); *H04L 45/123* (2013.01); *H04L 45/44* (2013.01)

(58) Field of Classification Search
CPC .... H04L 7/0033; H04L 7/0041; H04L 7/0037; H04L 7/03337; H04L 2012/5646; H04L 2012/5649; H04L 43/0852; H04L 43/0864; H04L 45/121; H04L 41/14
See application file for complete search history.

(56) References Cited

U.S. PATENT DOCUMENTS

| 5,784,364 | A | 7/1998 | Ahn et al. |
| 6,226,266 | B1 | 5/2001 | Galand et al. |
| 7,990,887 | B2 | 8/2011 | Cidon et al. |
| 8,510,464 | B2 | 8/2013 | Dharmistan |
| 2005/0094628 | A1 | 5/2005 | Ngamwongwattana et al. |
| 2010/0226255 | A1* | 9/2010 | DiStasio ................ H04L 43/08 370/241 |
| 2010/0287517 | A1* | 11/2010 | Buss ..................... H03G 7/007 716/113 |

(Continued)

FOREIGN PATENT DOCUMENTS

EP  2541849 A1  1/2013

OTHER PUBLICATIONS

Katabi, Dina et al.: "Inferrring Congestion Sharing and Path Characteristics from Packet Interarrival Times," Internet Article, Dec. 31, 2001, p. 13pp, URL:http://bitsavers.informatik.uni-stuttgart.de/pdf/mit/lcs/tr/MIT-LCS-TR-828.pdf, p. 1, right-hand column, line 20-line 39.

(Continued)

*Primary Examiner* — Ashley Shivers
(74) *Attorney, Agent, or Firm* — Parker Ibrahim & Berg LLC; James M. Behmke; Stephen D. LeBarron

(57) ABSTRACT

In one embodiment, a method is disclosed in which a device receives delay information for a communication segment in a network. The device determines a predictability measurement for delays along the segment using the received delay information. The predictability measurement is advertised to one or more devices in the network and used as a routing constraint to select a routing path in the network.

20 Claims, 17 Drawing Sheets

(56) References Cited

U.S. PATENT DOCUMENTS

| | | | | |
|---|---|---|---|---|
| 2011/0058498 | A1* | 3/2011 | Miyoshi | H04L 45/00 370/253 |
| 2014/0016688 | A1* | 1/2014 | Venkataramani | H04L 25/03038 375/232 |
| 2014/0358825 | A1* | 12/2014 | Phillipps | G06Q 30/0241 706/11 |
| 2015/0016242 | A1* | 1/2015 | Ernstrom | H04L 45/122 370/218 |

OTHER PUBLICATIONS

Varga, Pal: "Analyzing Packet Interarrival Times Distribution to Detect Network Bottlenecks," Eunice 2005, Aug. 6, 2005, pp. 17-29, URL:http://rd.springer.com/content/pdf/10.1007%2FO-387-31170-X_2.pdf.

International Search Report and Written Opinion dated Sep. 9, 2015 in connection with PCT/US2015/028115.

Farrel, et al., "A Path Computation Element (PCE)-Based Architecture", The Internet Society, Network Working Group, Request for Comments 4655, Aug. 2006, 41 pages, The Internet Society.

Gnawali, et al., "The Minimum Rank with Hysteresis Objective Function", Request for Comments 6719, Sep. 2012, 13 pages, Internet Engineering Task Force Trust.

Hinden, et al., "Initial IPv6 Sub-TLA ID Assignments", Network Working Group, Request for Comments 2928, Sep. 2000, 7 pages, The Internet Society.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

* cited by examiner

DISTRIBUTED PREDICTIVE ROUTING USING DELAY PREDICTABILITY MEASUREMENTS

TECHNICAL FIELD

The present disclosure relates generally to computer networks, and, more particularly, to making routing decisions in time sensitive networks.

BACKGROUND

Time sensitive networks (TSNs) are a class of networks in which greater emphasis is placed on the control of packet delivery times. Interest in TSNs has increased in recent years in areas such as industrial automation, automotive control, media streaming, etc. For example, link layer technologies such as Deterministic Ethernet and Industrial Wireless Automation have emerged in recent years to enable the construction of TSNs. In general, these technologies operate by determining an amount of delay associated with a communication path in the network. The delivery time of a packet can then be calculated by offsetting the transmittal time of the packet by the delay. If the network is under relatively static conditions, the scheduling and delivery of packets within a TSN may be controlled with a high degree of precision.

Implementing a TSN routing strategy is particularly challenging within low power and lossy networks (LLNs) and other networks that experience varying network conditions. In comparison to traditional networks, these types of networks may exhibit lossy links, low bandwidth, limited battery operations, low memory and/or processing capabilities, etc. Changing environmental conditions may also affect device communications such as physical obstructions (e.g., the opening and closing of doors, changes in the foliage of nearby trees, etc.), changes in interference (e.g., from other wireless networks or devices), and changing propagation characteristics of the media (e.g., temperature or humidity changes, etc.). Accordingly, delays along a given communication path may also be variable, making it difficult to control packet delivery times in certain types of networks, such as LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
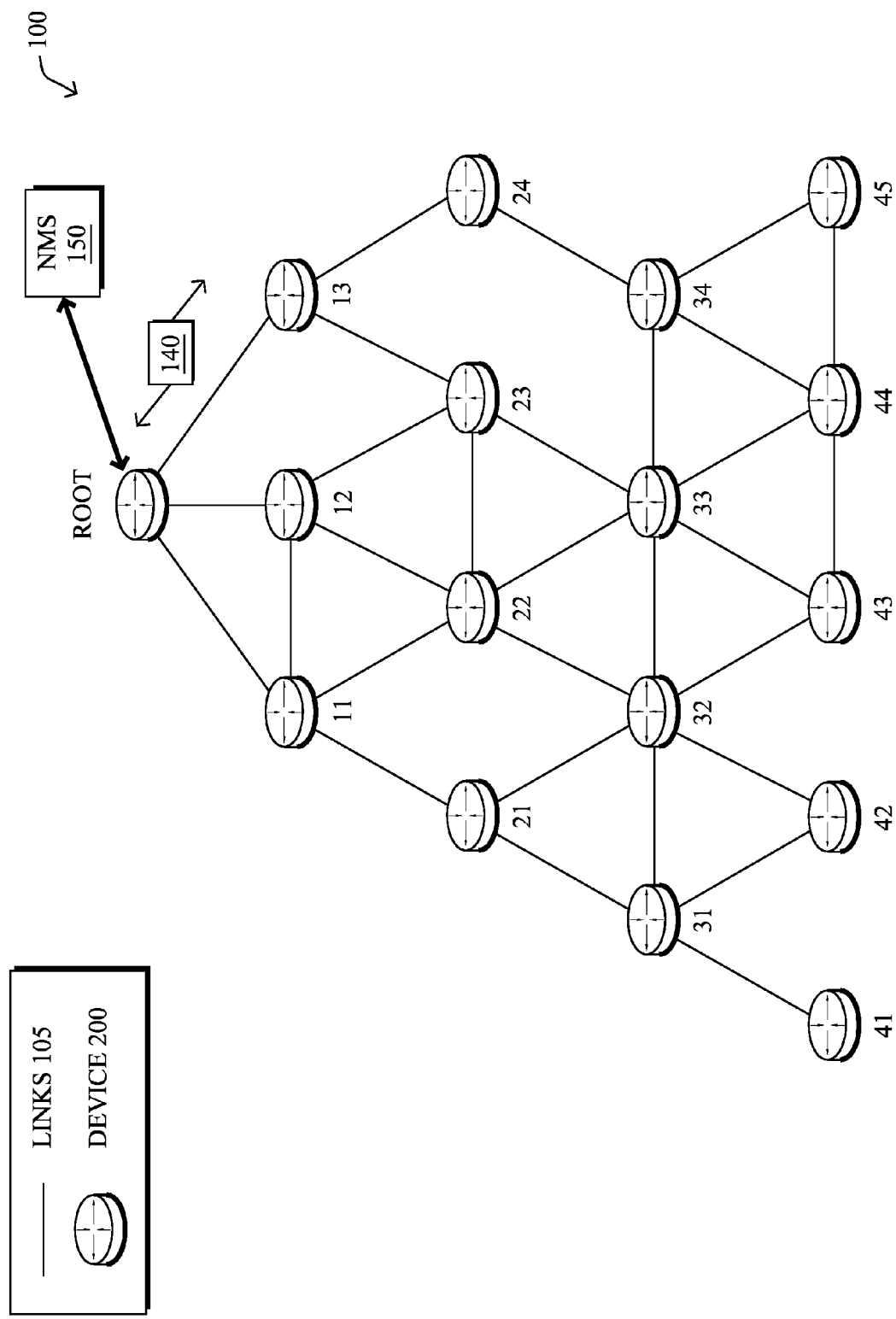
FIG. 1 illustrates an example communication network.

According to one or more embodiments of the disclosure, machine learning processes may be distributed to network devices/nodes that predict delays along communication segments. The predictability of these delays may then be distributed to other nodes/devices and used to select a communication path, either as a metric or as a constraint.

In some embodiments, a method is disclosed in which a device receives delay information for a communication segment in a network. The device determines a predictability measurement for delays along the segment using the received delay information. The predictability measurement is advertised to one or more devices in the network and used as a routing constraint to select a routing path in the network.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
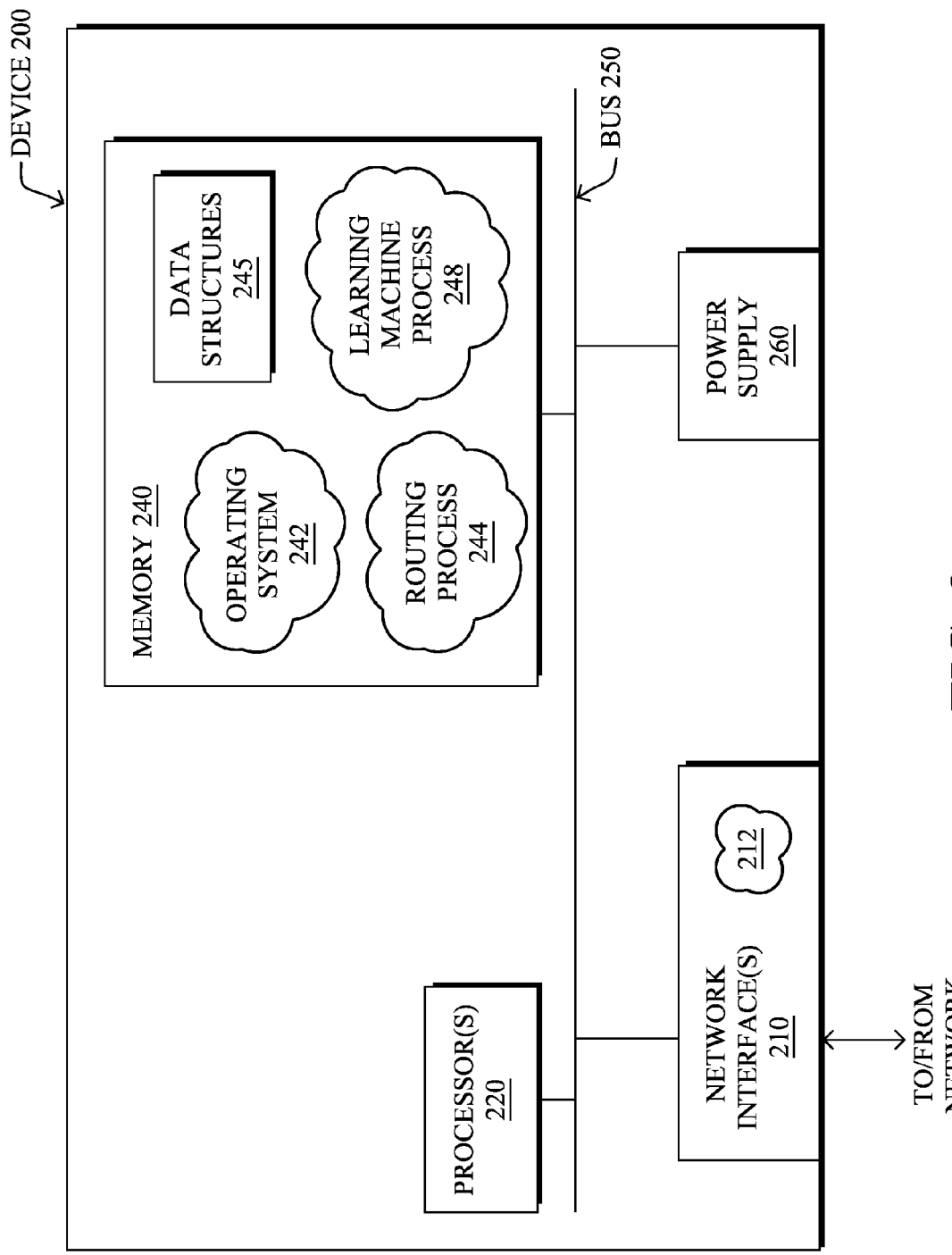
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative learning machine process 248, as described herein. Note that while certain processes are shown in centralized memory 240, alternative embodiments provide for these processes to be specifically operated within the network interfaces 210, such as a component of a MAC layer (process "212").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built based on an Objective Function (OF). The role of the Objective Function is generally to specify rules on how to build the DAG (e.g., the number of parents, backup parents, etc.).

As noted above, implementing time sensitive routing strategies in an LLN is challenging, since the delays along a given path may vary. In particular, approaches that attempt to optimize the network in terms of delay times, bandwidth allocations, or other such metrics may inadvertently select communication paths that exhibit high variations in their delay times. In cases where time sensitivity is paramount, however, the optimal choice of a communication path may be one that has a higher delay than another path but demonstrates a greater degree of predictability in its delay.

Distributed Predictive Routing Using Delay Predictability Measurements

The techniques herein provide for a distributed solution whereby routers in a network host a machine learning process configured to quantify how predictable transmission delays are along a given segment of the network. As used herein, a segment generally refers to a single communication link (e.g., a single hop link) or a multi-hop link between nodes/devices that execute such a process. As will be appreciated, a communication path to route data within the network may comprise one or more segments. In one aspect, a particular node/device may identify the set of one or more segments of interest based on a probing function. A node/device may aggregate delay information for its identified segments of interest. For example, a node/device may compute a probability distribution function based on segment delay information that is advertised using a modified routing protocol extension. Any node in the network may then make use of advertised predictability of segments thanks to the routing protocol in order to The node/device may then compute predictability measurement of delays along a segment, to determine constrained shortest paths using the delay predictability measurement/constraint. In various cases, the delay predictability measurement may be represented as a series of predictability metrics such as the moments of the underlying probability distribution, a Sarle's coefficient, Shannon's entropy value, or the like.

Said differently, every capable router in a network may compute its own delay predictability metrics for its segment or segments (e.g., single links to other devices or multi-hop connections to other devices). The delay predictability metrics may also be advertised to other routers, allowing the delay predictability metrics to be used when selecting a communication path (e.g., as a metric or constraint used by the routing process).

Specifically, according to one or more embodiments of the disclosure as described in detail below, a method is disclosed in which a device receives delay information for a communication segment in a network. The device determines a predictability measurement for delays along the segment using the received delay information. The predictability measurement is advertised to one or more devices in the network and used as a routing constraint to select a routing path in the network.

Illustratively, the techniques described herein may be performed by hardware, software, and/or firmware, such as in accordance with the processes 244, 248, which may contain computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, path computations may be performed within a network with the objective of guaranteeing the prediction of a delay from a machine learning process. In particular, communication paths may be selected that optimize the delay predictability in light of other metrics such as the delay itself, bandwidth, etc. In other words, a path may be selected based on how predictable the delay is along its segment(s), thereby increasing the predictability of packet deliveries along the path.

According to various embodiments, any or all of the nodes/devices in a network may execute a machine learning process (e.g., learning machine process 248) that receives segment delay information as an input and outputs a probability distribution function of a predicted delay. Such a function may be a probability density function (PDF), cumulative density function (CDF), or the like. Generally speaking, machine learning is concerned with the design and the development of processes that take as input empirical data (e.g., network statistics and performance indicators), and recognize complex patterns in these data. These patterns are then used to make decisions automatically (e.g., via close-loop control) or to help make decisions. Common tasks that may be performed using machine learning are the following: linear and non-linear regression, classification, clustering, dimensionality reduction, anomaly detection, optimization, association rule learning.

One very common pattern among machine learning processes is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The machine learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Figure 3A:
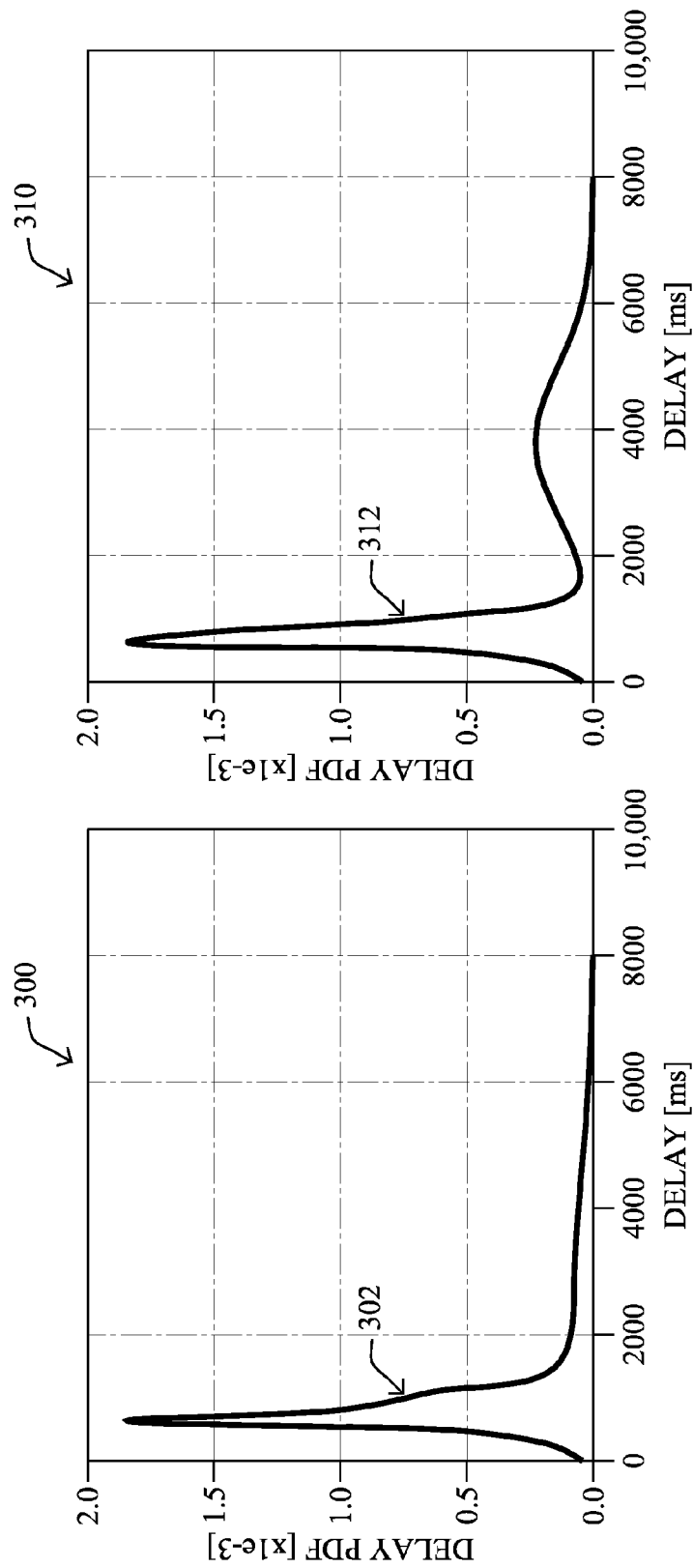
FIG. 3A-3F illustrates example delay probability distribution functions for different network segments.
Figure 3B:
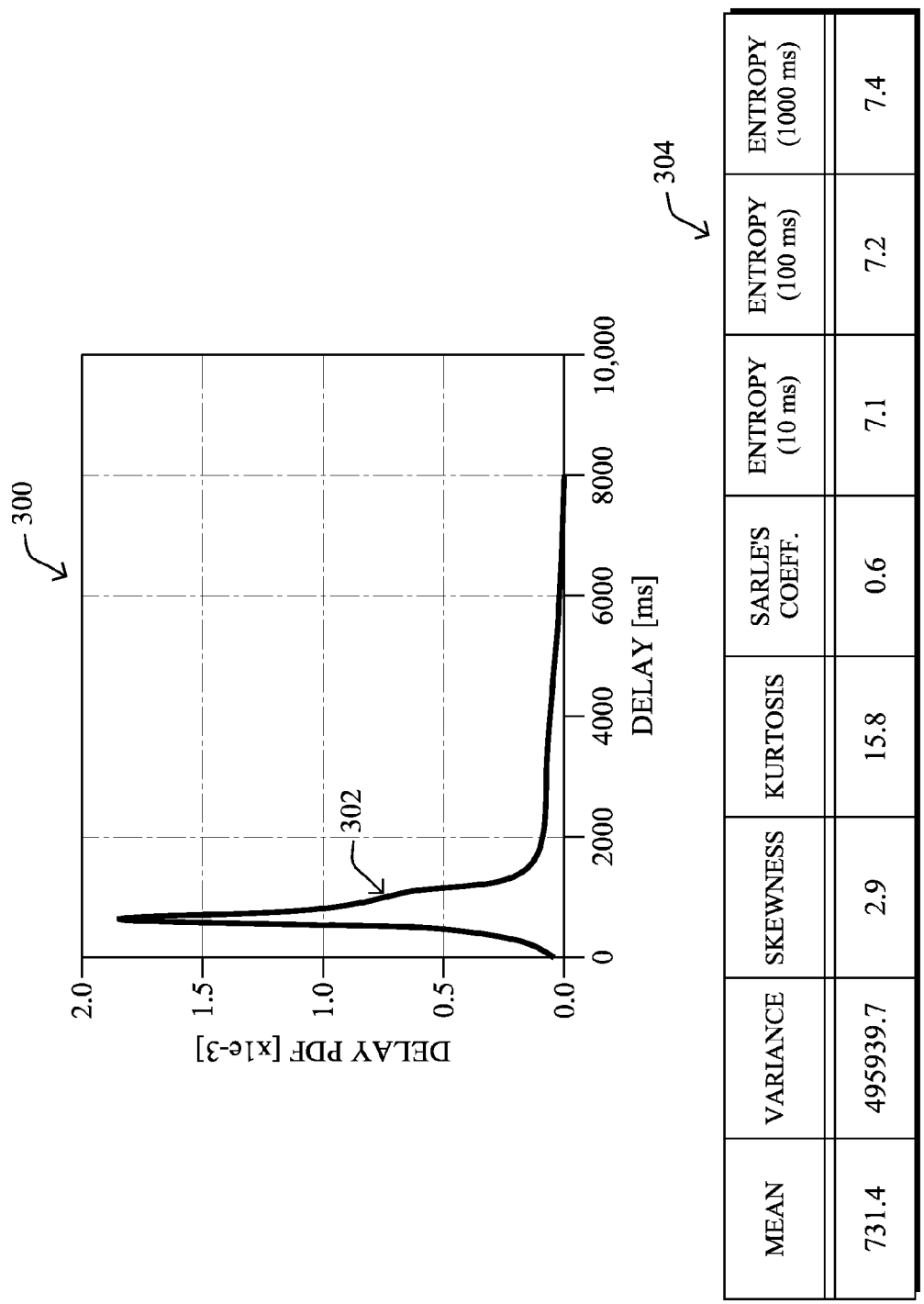
Figure 3C:
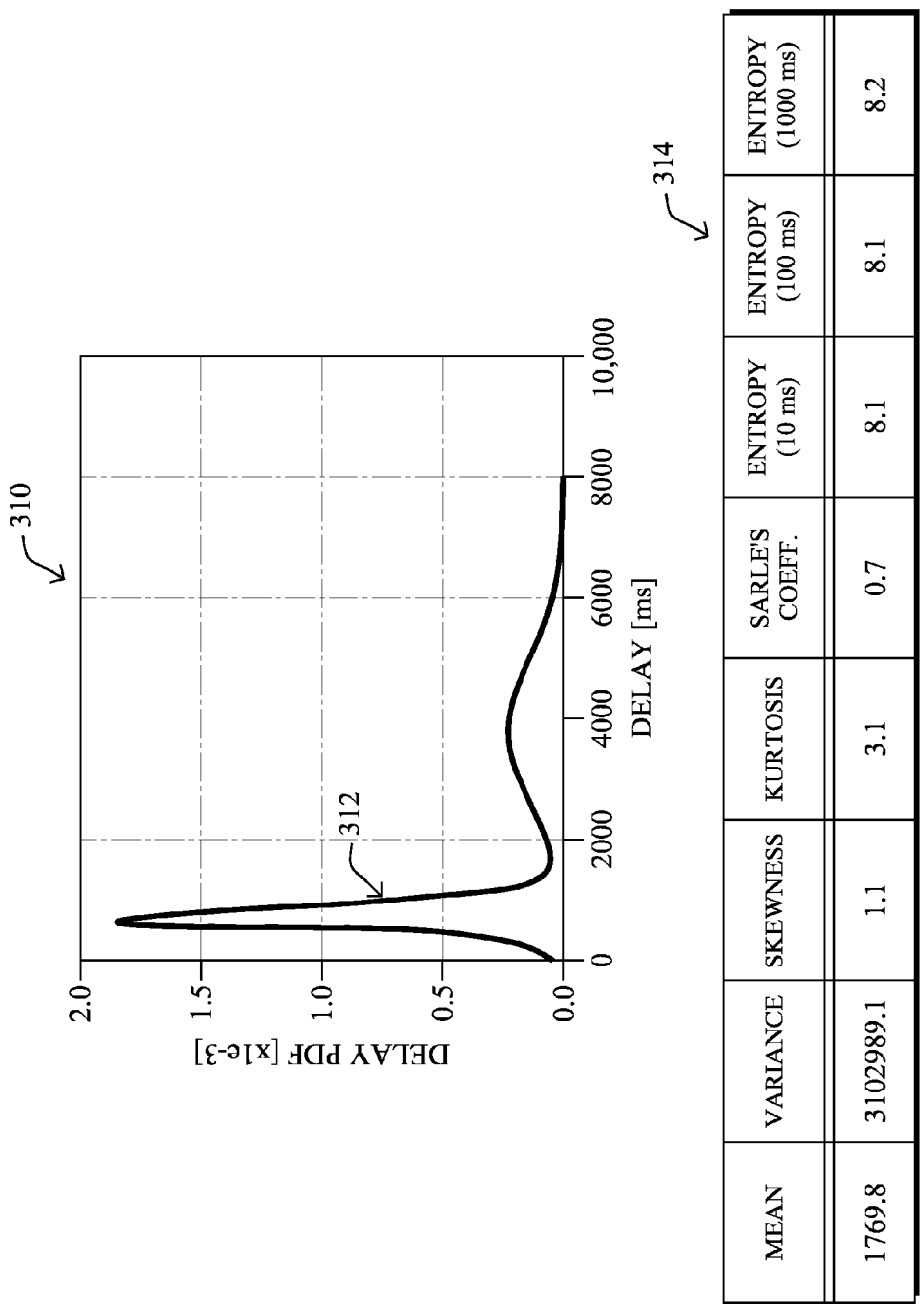
Figure 3D:
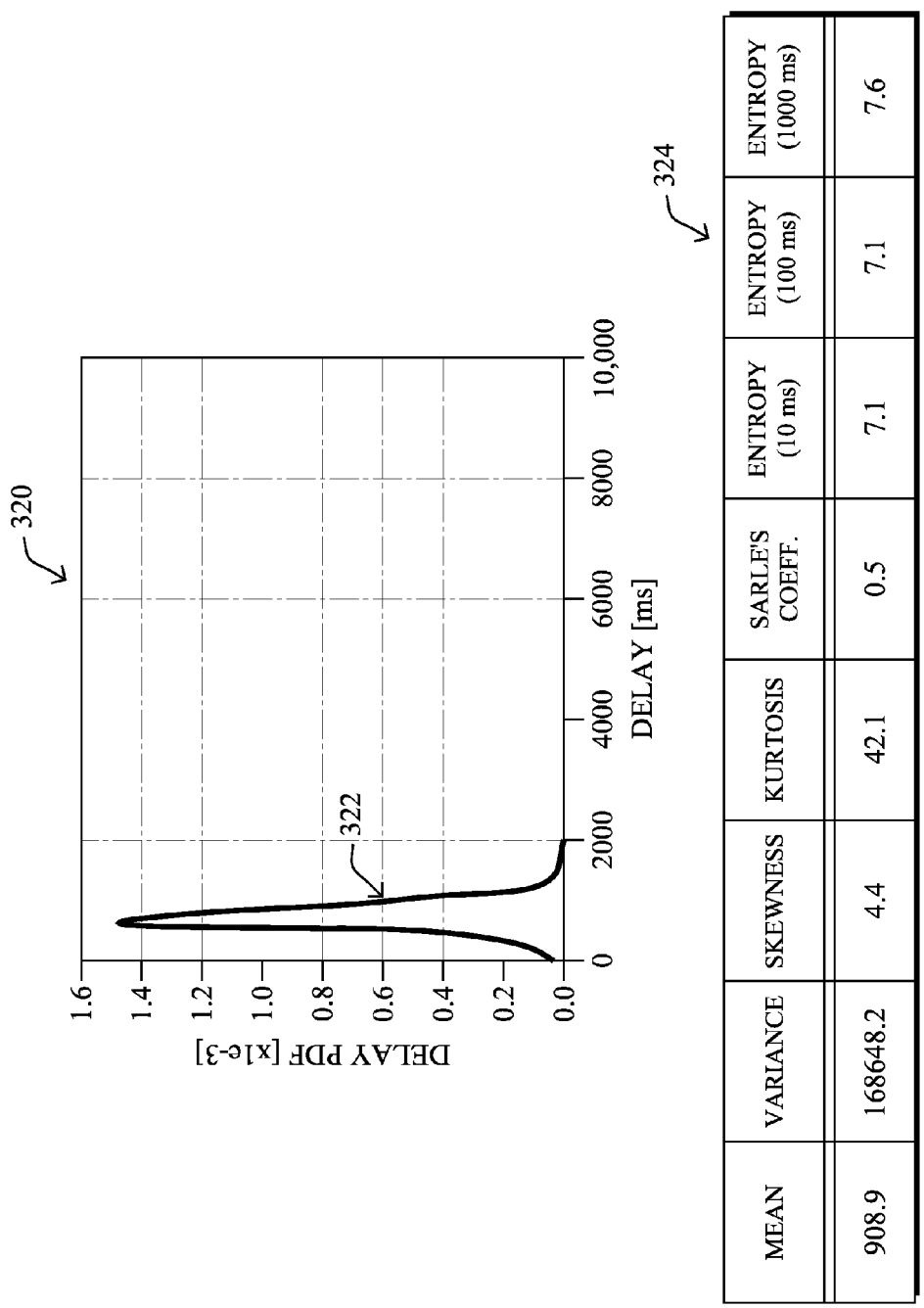
Figure 3E:
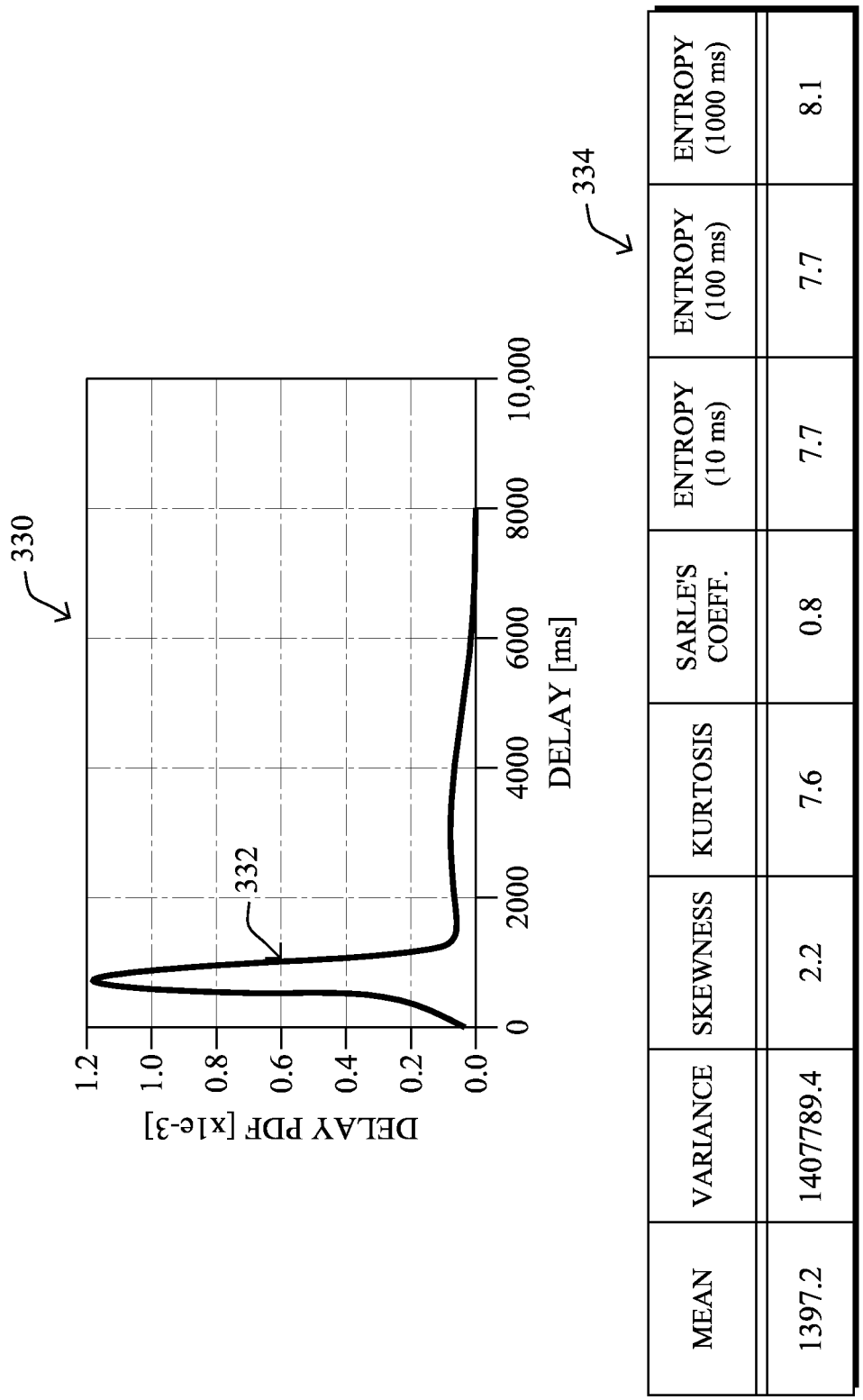
Figure 3F:
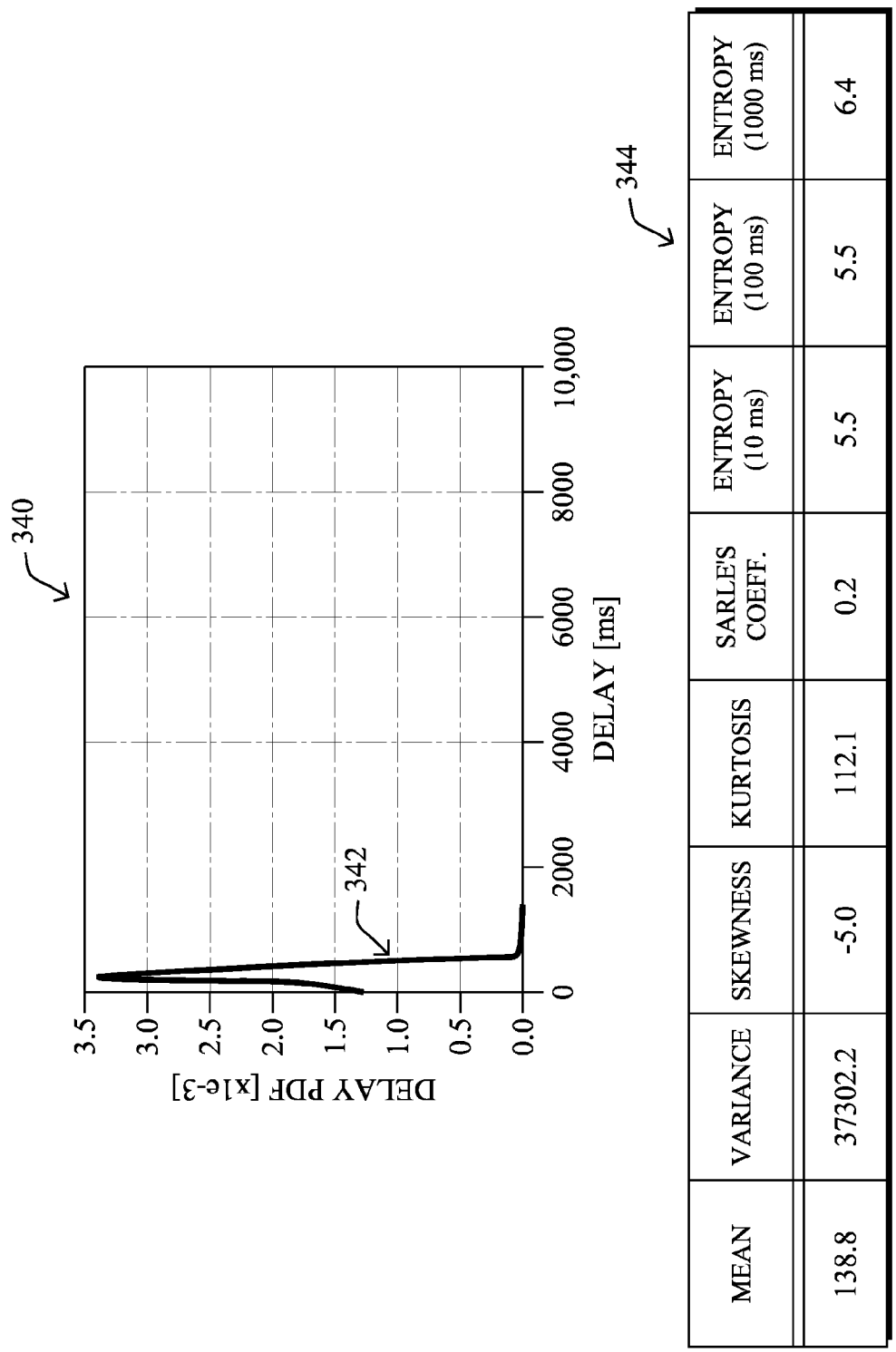

Referring now to FIG. 3A, example communication delays observed along different network segments are shown in plots 300, 310 as probability distribution functions 302, 312. As shown, probability distribution functions 302, 312 are probability density functions that represent how likely the segments are to experience a particular amount of delay. Based on the shape of function 302 in relation to function 312, it can be seen that delays along the segment from function 312 are less predictable than for the segment from function 302.

In various embodiments, a node/device may quantify the predictability of the delay along the segment using one or more metrics regarding a generated probability function. FIGS. 3B-3F illustrate example plots 300-340 of probability distribution functions (e.g., functions 302, 312, 322, 332, and 342) of delays along different network segments and their respective metrics (e.g., metrics 304, 314, 324, 334, and 344) for different network segments.

In some cases, the predictability of the delay along a segment may be quantified using one or more moments of the predicted distribution of the delay. Such values may include the mean, variance, skewness (e.g., a measure of the asymmetry of the function), kurtosis (e.g., a measure of the "peakedness" of the function), or combinations thereof. For example, a vector of the form [mean, variance, skewness, kurtosis] may be used as a predictability measurement of the expected delay along a network segment. In the case where the delay is predicted with a mixture of normal distributions, the vector may also include a coefficient describing how multimodal the delay distribution is. Such coefficient may be a function of each normal component moments. For example, Sarle's bimodality coefficient ($\beta$) may be used as another measurement of the distribution function and can be computed as follows:

$$\beta = \frac{\gamma^2 + 1}{\kappa}$$

where $\gamma$ is the skewness of the distribution function and $\kappa$ is the kurtosis. The value of a Sarle's coefficient can vary from zero to one. Additionally, a Sarle's coefficient having a value of 5/9 indicates that the function has a uniform distribution. Typically, a Sarle's coefficient having a value greater than 5/9 may indicate a bimodal or multimodal distribution.

Entropy measurements from a generated probability function may also be used as a measure of how predictable the delay along a network segment is. Continuous or discrete entropy may be determined, in various cases. In addition, if the entropy is not computable from the expression of the PDF of the distribution, the entropy may be estimated empirically by discretizing the distribution. For example, in the case where the delay is predicted with a mixture of normal distributions, the histogram estimation of Shannon entropy may be calculated from the CDF and estimated from histogram with different bin sizes. The formula for the entropy of time scale size_bin is as follows:

$$\text{entropy} = \sum_{i=0}^{n} \frac{CDF(bin_i) * \log(CDF(bin_i))}{size\_bin}$$

As shown in FIGS. 3B-3F, entropy values may be calculated for each function using different bin sizes (e.g., 10 ms, 100 ms, and 1000 ms). Other bin sizes may be used in further implementations. Also shown are the mean, variance, skewness, kurtosis, and Sarle's coefficients for each function. As will be appreciated from FIGS. 3B-3F, the entropy values and Sarle's coefficients are relatively good measurements of the predictability of the delay along a network segment.

As noted above, some or all of the network routers of a routing domain may execute a machine learning process that is configured to compute a probability function (e.g., a PDF, CDF, etc.) for a predicted delay of a network segment. In other words, segment delay predictions and/or delay predictability measurements may be calculated in a distributed manner throughout the network by the various network nodes. In one embodiment, the hosting of such a machine learning process may be controlled by a supervisory device, such as an NMS. For example, the NMS may install a machine learning process at a particular node or control the activation/deactivation of such a process at the node.

Figure 4A:
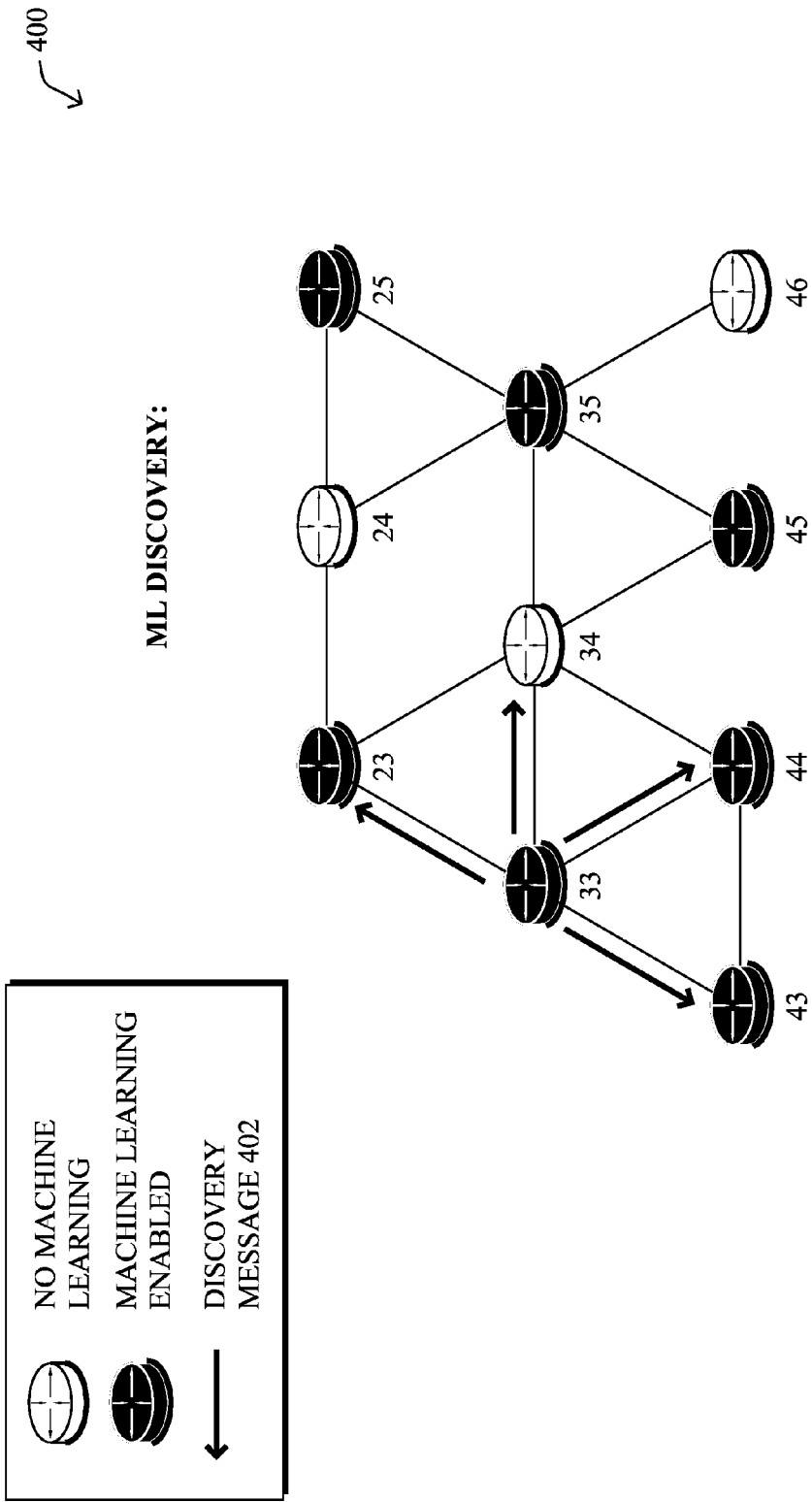
FIGS. 4A-4C illustrate examples of a device/node identifying segments to analyze.

According to some embodiments, a router with an enabled machine learning model may dynamically select which network segments are to be analyzed by the device (e.g., to generate PDFs of predicted delays for the segments). For example, as shown in FIG. 4A, assume that devices 23, 25, 33, 35, and 43-45 are configured with machine learning processes. In such a case, each of these devices may dynamically determine which segments are to be analyzed by the device. In the simplest form, a segment is a point-to-point link (e.g., optical, SDH, Ethernet, etc.) between two devices. In more complex forms, a segment may be an N-hop connection, should the immediate neighbor not host a machine learning process. For example, device 34 may be an immediate neighbor of device 33 but does not host a machine learning process that predicts segment delays. To determine which segments are to be analyzed by a particular device, the device may dynamically discover which nodes are also hosting a machine learning process for delay estimations.

Discovery of other devices hosting machine learning processes may be achieved in a number of ways. For example, device 33 may send a discovery message 402 to its neighboring devices, to discover which devices in the network also host machine learning processes. In one embodiment, the device may use a new routing extension to discover which other devices are also hosting machine learning processes. Such an extension may have the form of a single bit (e.g., "ML Active") or, when supported by the routing hello protocol, it could be included in a TLV characterizing the machine learning attributes. If all routers host a machine learning process, local hellos could be used for the discovery. In one embodiment, routing hellos are used for machine learning process discovery. If the routing protocol does not support carrying additional TLV data (e.g., OSPF Hello messages, etc.), the attributes may be advertised using an opaque LSA Type 9 message. Otherwise, if there are segments with lengths longer than 2-hops, then multi-hop hellos (e.g., BFD) protocols or routing protocols may be used for next-hop machine learning process discovery. In the case of ISIS, this would be carried out using a new TLV. For OSPF such TLV would be carried in a type 10 Opaque LSA and with a protocol such as RPL. Such a TLV would be carried out in using the NSA object itself carried in the DAG Metric container of a DIO message.

Each router hosting a machine learning process then determines the set of segments for which it must predict the transmission delays (e.g., by generating a delay PDF) and calculating a corresponding delay predictability metric. If each neighbor for which a routing adjacency is active has a machine learning process enabled, all segments have the simplest form of a link (e.g., a single hop segment). Otherwise, segment may have N-number of hops. The number of hops present in the ith segment ($S_i$) may be denoted as $L(S_i)$. Thus, each router may compute the list of segments for which predictability measurements are needed.

Figure 4B:
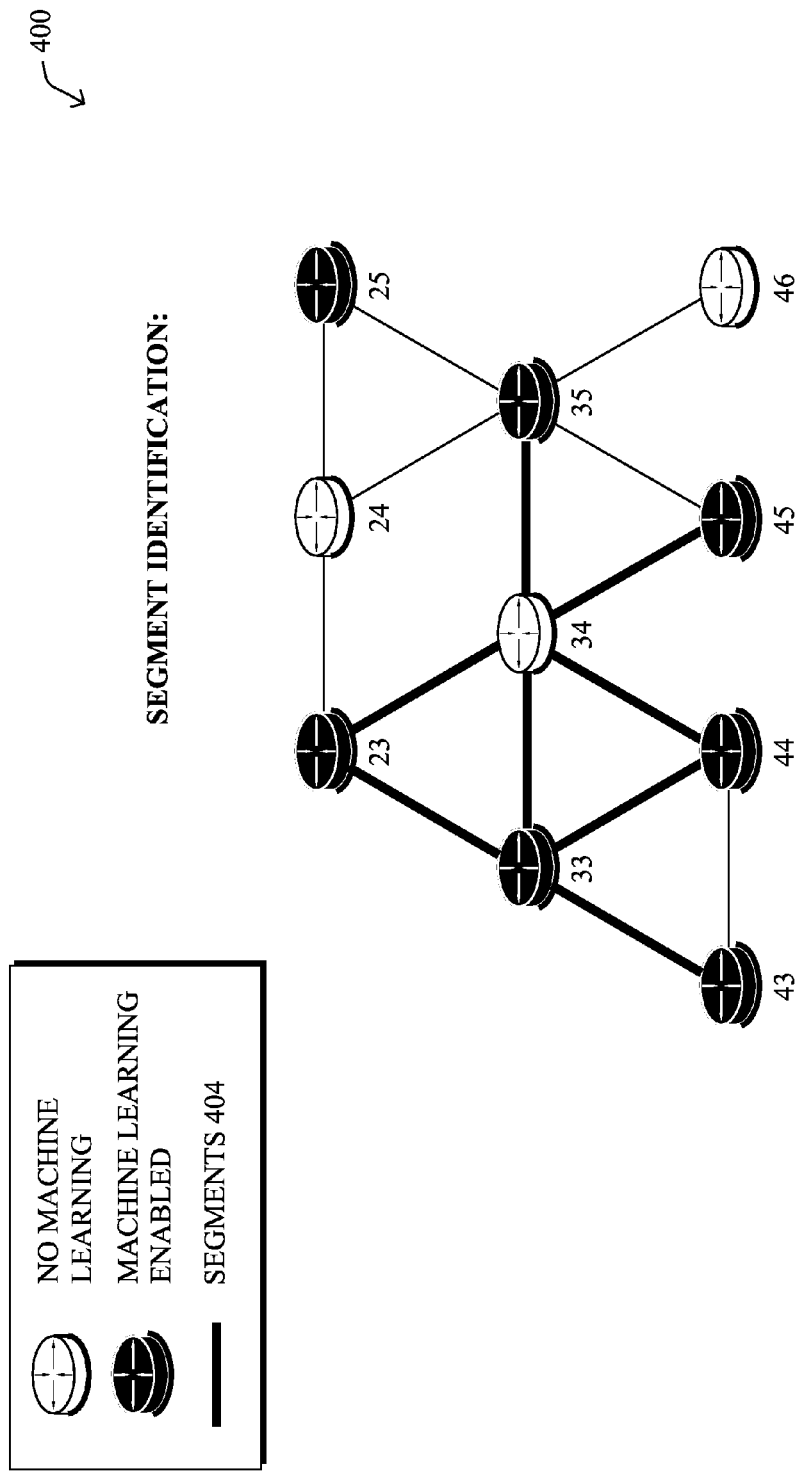

If each neighbor of a device also hosts the machine learning process, |S| is equal to the number of neighbors and L(S(i)) is equal to 1 for i=1 to |S|. However, if one or more of the immediate neighbors do not all host an active machine learning process, the cardinality of the S set may vary according to the dynamically discovered routers attributes. For example, in FIG. 4B, router 43 has 2 segments, both of which are links. Similarly, router 33 has three segment of length 1 (e.g., links), namely segments 33-43, 33-44, 33-23, and four segments of length 2 (e.g., segments 33-34-44, 33-34-45, 33-34-35, 33-34-23). Thus, thus |S|=7 for router 33 based on its discovery of neighboring machine learning processes.

Figure 4C:
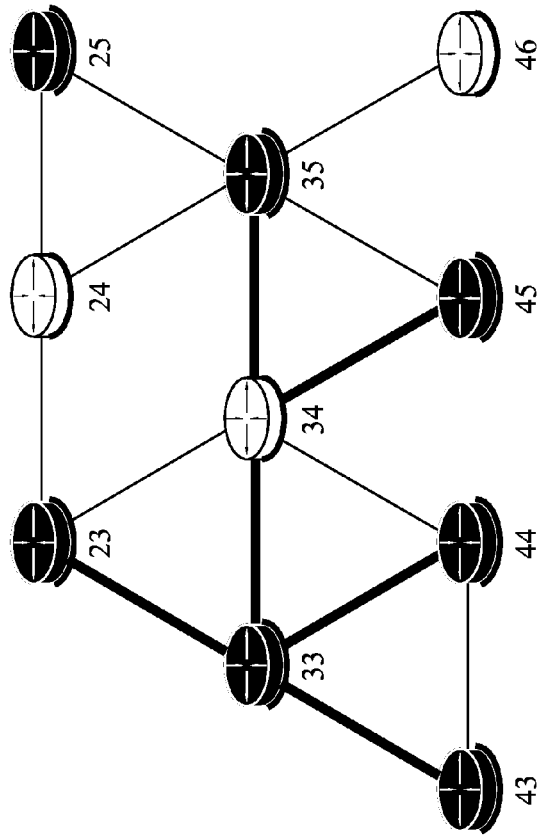
Figure 4C:

If the network makes use of a shortest path first approach without additional constraints (e.g., using ISIS, OSPF, etc.), a non-shortest path segment may be pruned from the set of segments under consideration by a device. In other words, a router may terminate the computation of its list S when shortest path first is the routing mode of operation by pruning all segments for which there exists a shortest path such that the immediate neighbor also hosts a machine learning process. For example, as shown in FIG. 4C, assume that all of the links shown have the same metrics used by the shortest path first methodology. In such a case, segment 33-34-44 may never be used by any paths computed by routers in the network since a shorter path 33-44 exists. Accordingly, segment 33-34-44 may be pruned from the list S of segments under consideration by the machine learning process of device 33. Segment 33-34-23 may be pruned or disregarded for similar reasons. Thus, the list S computed by the node 33 after pruning is S={33-23(1), 33-43(1), 33-44(1), 33-34-35(2), 33-34-45(2)}, where ( ) is equal to L(S(i)), the segment length. Even assuming, however, that each link has the same length/delay, there still exists a lack of predictability for any link that is attached to a router that does not have an enabled machine learning process. Also, if the routing mode of operation involves constraints such as constrained shortest path first (e.g., as in the case of MPLS Traffic Engine), non-shortest paths may still be of use in the network, in which case the list S should not be pruned.

Figure 5A:
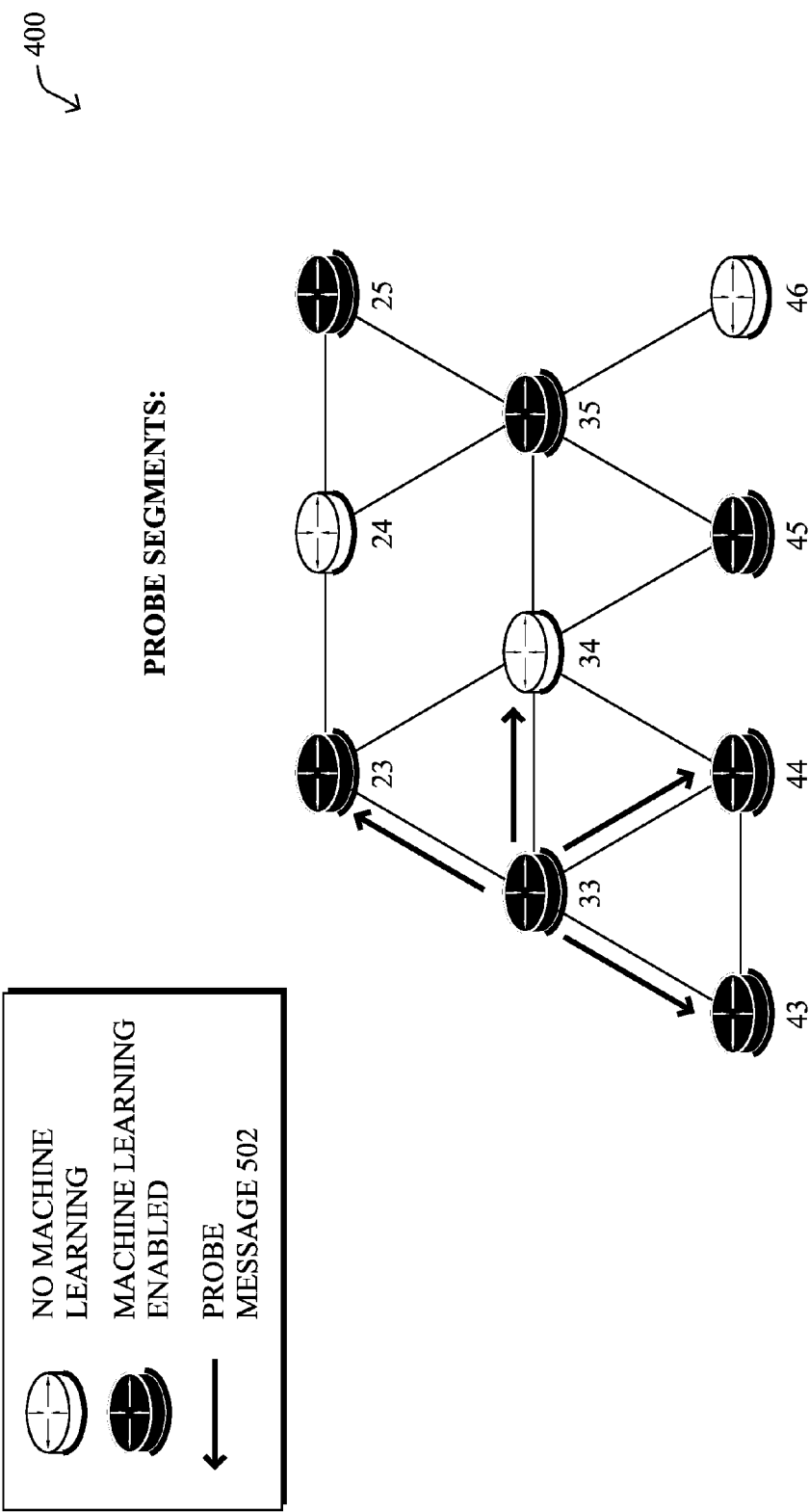
FIGS. 5A-5B illustrate an example of a device/node determining a predictability measurement for delays along a segment.
Figure 5B:
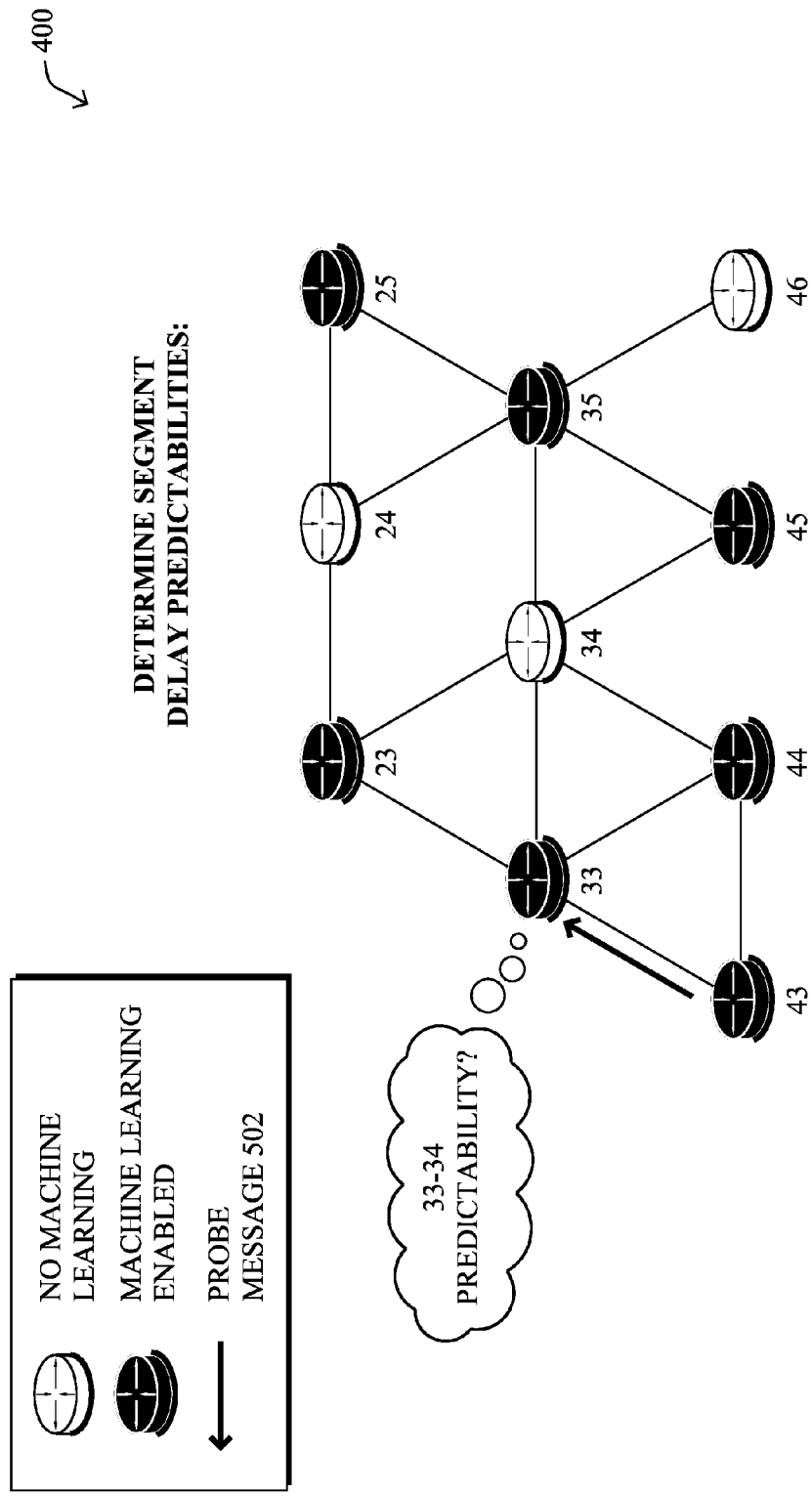

Once a device has determined which segments are of interest, the device may begin a training period in which it collects delay information for its machine learning process. In one embodiment, the device may actively probe each segment in its list S, to provide inputs to its machine learning process. For example, as shown in FIGS. 5A-5B, device 33 may send one or more probe messages 502 to its neighbors and receive delay information 504 from its neighbors. Probe message 502 may be in accordance with a hello mechanism of a protocol already in use by the network, such as a routing protocol hello (e.g., in OSPF, ISIS, etc.). In some cases, the hello periodicity of the protocol may be too high for purposes of training. For example, a hello period may be as high as eighteen hours in ISIS. In such cases, other protocols such as BFD may be used where the frequency of probing is generally high. In another embodiment, a new IPv6 source routed probe may be used with time stamps, allowing the delay between a particular device and the end of a segment to be computed. The received delay information that results from the delay probes may then be used to generate the delay predictions via the machine learning process. For example, as shown in FIG. 5B, device 33 may generate a PDF of delay times for segment 33-43 based on the received delay information 504. In addition, device 33 may also determine a predictability measurement for the expected delay for this segment.

Figure 6A:
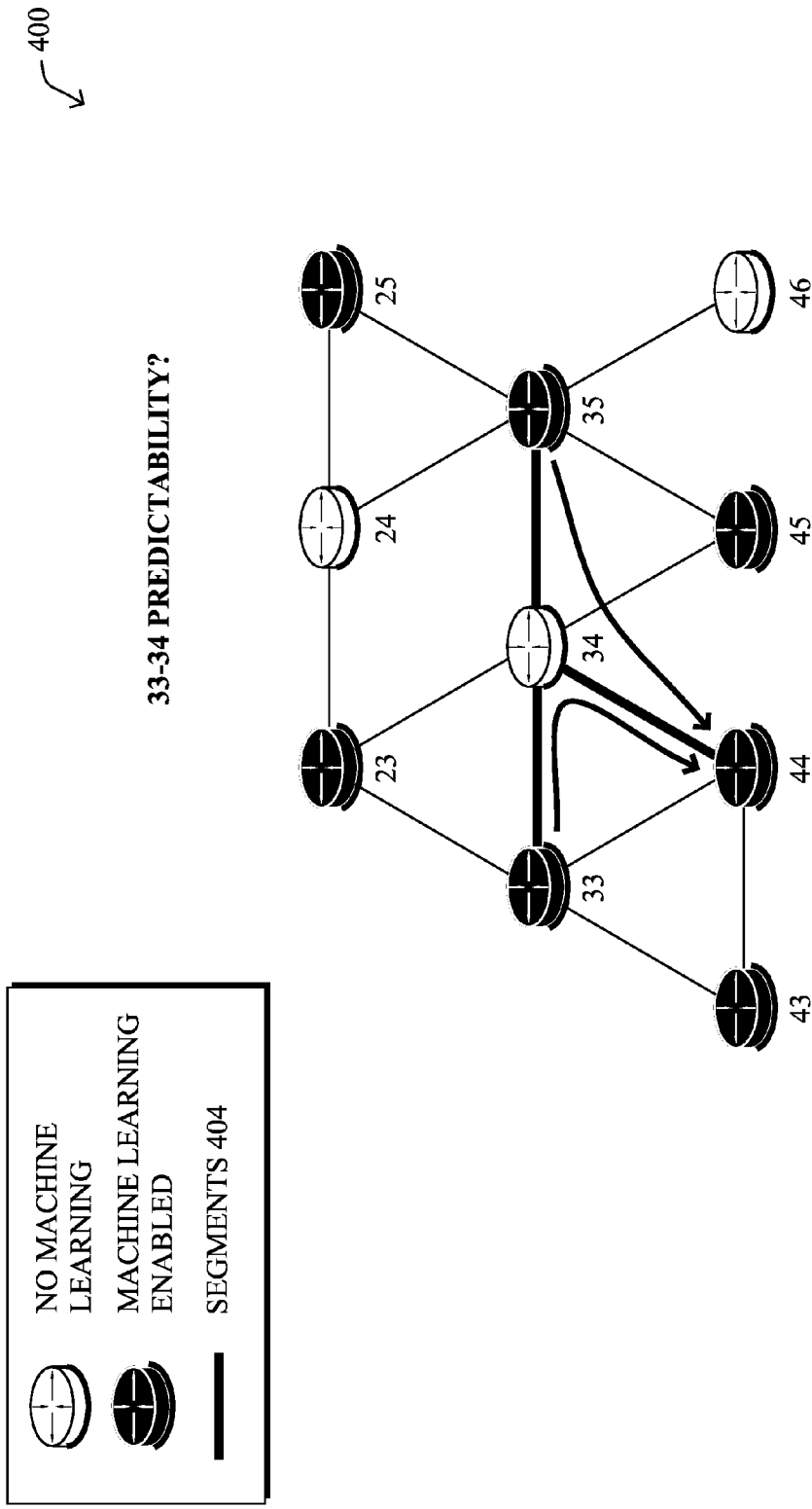
FIGS. 6A-6C illustrate an example of a delay predictability measurement being inferred.
Figure 6B:
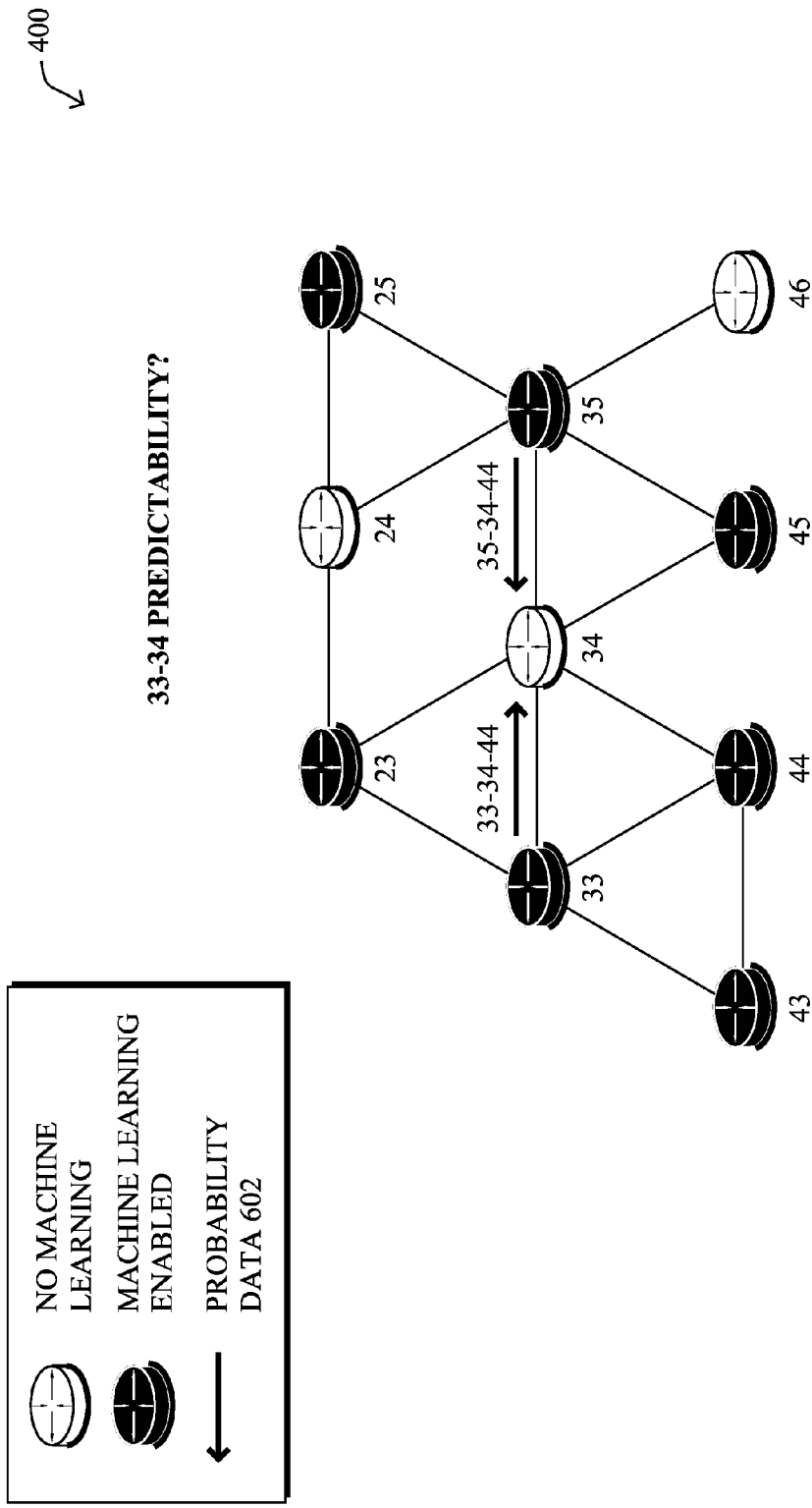
Figure 6C:
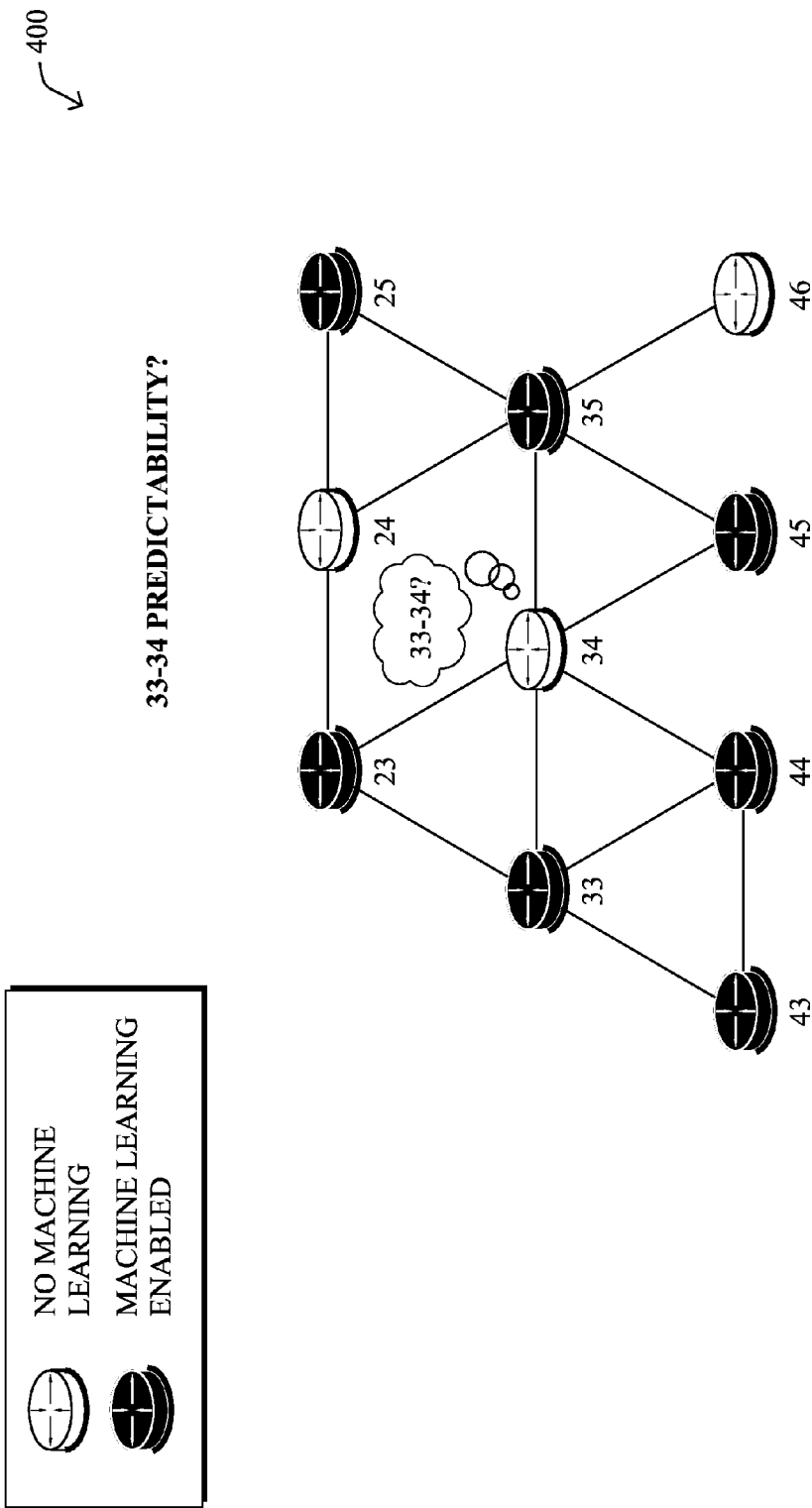

In some embodiments, a predictability measurement may be derived for a link attached to a device that does not have an active machine learning model. For example, as shown in FIGS. 6A-6C, a measurement of the predictability of the delay associated with link 34-44 may not be directly obtainable since device 34 does not have an active machine learning process. In such a case, advertised link delay predictability measurements may be used to derive the delay predictability for a given link. As noted above, the delay predictability may be represented as a series of predictability metrics such as the moments of the underlying probability distribution, the Sarle's coefficient, Shannon entropy, etc. In some cases, a device may explicitly advertise such metrics. In other cases, the device may instead advertise the underlying probability distribution, thereby allowing another device to reconstruct the metrics from the distribution. For example, if a distribution is modeled as a mixture of Gaussians, it may be advertised as a new TLV that encodes the number of experts, and for each expert, its weight, mean, and variance.

As shown in the example of FIGS. 6A-6C, delay predictability information for overlapping segments may be analyzed to infer a delay predictability measurement for a local link. For example, if router 33 advertises the delay predictability of the segment 33-34-44, and similarly router 35 advertises its metric for the segment 35-34-44 (e.g., routers 33, 35 may send probability data 602 to device 34), router 34 may infer the delay predictability of link 34-44. For example, in one embodiment, router 34 may use an Expectation-Maximization technique to reconstruct the probability distribution that characterizes the delay on link 34-44. Based on this distribution, device 34 may then compute the predictability metrics corresponding to link 34-44.

Once delay predictability measurements/metrics have been determined by a router, the device ay advertise its analyzed segments and predictability metrics. In the simplest case of all 1-hop segments, a new link metric may be used in a manner similar to a traffic engineering (TE) metric computed by OSPF and used in MPLS TE enabled networks. In the set of segments includes a segment with two or more hops, virtual links may be extended, in order to attach the predictability metrics.

In various embodiments, the segment delay predictability measurements may be used to make routing decisions in the network. For example, the predictability measurements may be used as part of a multi-topology routing (MTR) strategy. In one implementation, if the network makes use of MPLS TE, the predictability metric can be used to compute paths according to such a metric. Traffic matching the constraints would be steered onto such a path that satisfies the predictability constraint. The delay predictability measurement may also be used as a constraint or a metric to optimize according to the traffic SLA requirement. In an MTR-enabled network, the delay predictability constraint may also be used to compute a distinct routing topology where shortest paths are computed to optimize such as constraint. Furthermore, when the topologies are computed according to the delay predictability, traffic may be steered onto the appropriate topology according to the required delay predictability.

Figure 7:
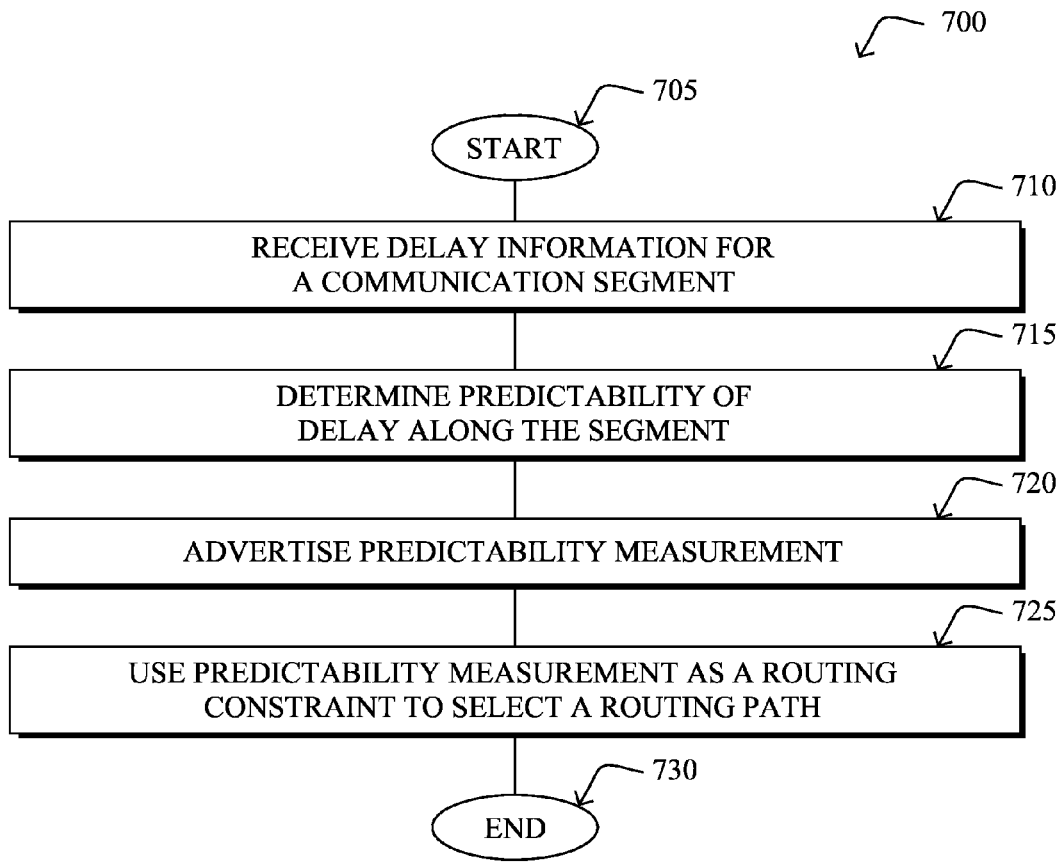
FIG. 7 illustrates an example simplified procedure for using a delay predictability measurement to control routing decisions.

FIG. 7 illustrates an example simplified procedure for using a delay predictability measurement to control routing decisions in accordance with one or more embodiments described herein. The procedure 700 may start at step 705, and continues to step 710, where, as described in greater detail above, delay information is received for a communication segment. As noted above, a communication segment may be a single hop link or may be a multi-hop segment (e.g., if a neighboring device is not running a machine learning process to estimate communication delays).

At step 715, the predictability of an estimated delay along the segment is determined, as detailed above. In various embodiments, a machine learning model may generate a probability distribution function (CDF, PDF, etc.) that represents the likelihood of different delay times along the segment. Metrics regarding such a distribution may be determined by the device and used as a measurement of the predictability of the estimated delay. For example, the mean, variance, skewness, kurtosis, Sarle's coefficient, entropy, combinations thereof, or the like, may be used as a measurement of the predictability of the delay along the segment.

At step 720, the predictability measurement may be advertised by the device, as described in greater detail above. For example, the predictability of an estimated delay for a segment may be advertised by a router as a TE metric or other constraint used to make routing decisions (e.g., delay predictability measurements may be distributed to other routers or to a network supervisor). In some embodiments, the predictability measurement, the delay function, and/or the underlying data used to derive either may be advertised to another device hosting a machine learning process. The other device may then validate the calculations (e.g., by re-estimating the delay, etc.) and may apply its own observation data to the model. In further embodiments, the predictability measurement and/or the delay function may be provided to an edge router or other device for use in routing decisions.

At step 725, as detailed above, the predictability measurement may be used as a routing constraint to determine a routing path in the network. In various embodiments, the delay predictability may be used as the only constraint (e.g., routing paths may be selected based solely on how predictable their delays are) or may be used in conjunction with other constraints (e.g., the shortest, most predictable paths are taken). For example, a segment having a greater delay than another segment may still be selected for routing if it exhibits greater predictability in its delay. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a distributed learning mechanism whereby nodes are able to estimate communication delays for paths and quantify how predictable the delay estimations are. In other words, a distributed solution for routing is disclosed based on the predictability of the delay along the path (e.g., as opposed to attempting to minimize simply the delay itself or even the delay variation). For time sensitive applications, such as in TSNs, these techniques allow for the more precise timing of packet scheduling and delivery within a network.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless) and even more generally with any other type of computing or communication network. In addition, while certain protocols are shown, such as RPL, other suitable protocols may be used, accordingly. Further, while the techniques herein have been described with respect to an estimated delay for a network path, the techniques may also be adapted for use with other determined network metrics. In other words, a predictability measurement for non-delay network metrics may also be used to make routing decisions, in other embodiments, in accordance with the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a network interface of a device in a computer network, delay information for a communication segment in the network;
   determining, by a machine learning process on the device, a predictability measurement for delays along the segment using the received delay information;
   advertising, via the network interface of the device, the predictability measurement to one or more other machine learning processes on one or more other devices in the network; and using, by the device, the predictability measurement as a routing constraint to select a routing path in the network.

2. The method as in claim 1, further comprising:

generating a probability distribution function using the delay information, wherein the predictability measurement is based on the probability distribution function.

3. The method as in claim 2, further comprising:

calculating the predictability measurement as an entropy measurement of the probability distribution function.

4. The method as in claim 2, further comprising:

calculating the predictability measurement as a vector that includes two or more of: a mean, variance, skewness, kurtosis, or Sarle's coefficient of the probability distribution function.

5. The method as in claim 2, wherein the probability distribution function is a cumulative distribution function or a probability density function.

6. The method as in claim 2, further comprising:

providing the probability distribution function to another device that calculates a delay predictability measurement using the distribution function.

7. The method as in claim 1, further comprising:

identifying a set of communication paths to neighboring devices, wherein the neighboring devices are configured to determine delay predictability measurements; and determining delay predictability measurements for the communication paths.

8. The method as in claim 7, further comprising:

determining a delay predictability measurement for a particular communication link by analyzing delay information for two or more overlapping paths in the set.

9. The method as in claim 7, further comprising:

pruning a path from the set of communication paths based on a determination that the set includes a shorter communication path to a destination of the pruned path.

10. The method as in claim 1, further comprising:

generating a routing topology that optimizes delay predictability measurements.

11. The method as in claim 10, further comprising:

selecting the routing topology from among a plurality of routing topologies based on the delay predictability measurements associated with the selected topology; and using the selected topology to route data.

12. An apparatus, comprising:

one or more network interfaces to communicate with a network;

a processor coupled to the network interfaces and adapted to execute one or more processes; and a memory configured to store a process executable by the processor, the process when executed operable to:

receive delay information for a communication segment in the network;

determine, by a machine learning process operating on the processor, a predictability measurement for delays along the segment using the received delay information;

advertise the predictability measurement to one or more other machine learning processes on one or more other devices in the network; and use the predictability measurement as a routing constraint to select a routing path in the network.

13. The apparatus as in claim 12, wherein the process when executed is further operable to:

generate a probability distribution function using the delay information, wherein the predictability measurement is based on the probability distribution function.

14. The apparatus as in claim 13, wherein the process when executed is further operable to:

calculate the predictability measurement as an entropy measurement of the probability distribution function.

15. The apparatus as in claim 14, wherein the probability distribution function is a cumulative distribution function or a probability density function.

16. The apparatus as in claim 13, wherein the process when executed is further operable to:

calculate the predictability measurement as a vector that includes two or more of: a mean, variance, skewness, kurtosis, or Sarle's coefficient of the probability distribution function.

17. The apparatus as in claim 12, wherein the process when executed is further operable to:

provide the probability distribution function to another device that calculates a delay predictability measurement using the distribution function.

18. The apparatus as in claim 12, wherein the process when executed is further operable to:

identify a set of communication paths to neighboring devices, wherein the neighboring devices are configured to determine delay predictability measurements; and determine delay predictability measurements for the communication paths.

19. The apparatus as in claim 12, wherein the process when executed is further operable to:

prune a path from the set of communication paths based on a determination that the set includes a shorter communication path to a destination of the pruned path.

20. A tangible, non-transitory, computer-readable media having software encoded thereon, the software when executed by a processor operable to:

receive delay information for a communication segment in a network;

determine, by a machine learning process, a predictability measurement for delays along the segment using the received delay information;

advertise the predictability measurement to one or more other machine learning processes on one or more other devices in the network; and use the predictability measurement as a routing constraint to select a routing path in the network.

* * * * *